United States Patent [19]
Kobayashi et al.

[11] Patent Number: 5,480,932
[45] Date of Patent: Jan. 2, 1996

[54] POLYPROPYLENE RESIN COMPOSITION AND A MOLDED ARTICLE THEREOF

[75] Inventors: Yutaka Kobayashi, Ichihara; Osamu Aoki, Wako; Kenji Hamabe, Wako; Atsushi Takeuchi, Wako; Takayuki Onda, Wako, all of Japan

[73] Assignees: Idemitsu Petrochemical Co., Ltd.; Honda Giken Kogyo Kabushiki Kaisha, both of Tokyo, Japan

[21] Appl. No.: 266,495

[22] Filed: Jun. 27, 1994

[30] Foreign Application Priority Data

Jun. 29, 1993 [JP] Japan ................................. 5-159209

[51] Int. Cl.$^6$ .............................. C08L 23/10; C08L 47/00; C08L 53/00; C08L 23/16
[52] U.S. Cl. ............................ 524/451; 525/71; 525/79; 525/93; 525/95; 525/193; 525/232; 525/236; 525/237; 524/388; 524/505
[58] Field of Search ...................... 525/193, 232, 525/71, 79, 95; 524/388, 379, 451

[56] References Cited

U.S. PATENT DOCUMENTS

| | | | |
|---|---|---|---|
| 5,196,270 | 3/1993 | Kitagawa et al. | 525/71 |
| 5,276,093 | 1/1994 | Kitagawa et al. | 525/71 |
| 5,321,080 | 6/1994 | Kumano et al. | 525/232 |
| 5,324,771 | 6/1994 | Suehiro et al. | 525/232 |
| 5,354,618 | 10/1994 | Ishigaki et al. | 525/193 |

*Primary Examiner*—Carman J. Seccuro, Jr.
*Attorney, Agent, or Firm*—Oblon, Spivak, McClelland, Maier, & Neustadt

[57] ABSTRACT

A polypropylene resin composition comprising: (a) 50 to 90% by weight of polypropylene, (b) 50 to 10% by weight of an ethylene-α-olefin copolymer elastomer having a Mooney viscosity (ML 1+4 (100° C.)) of 10 to 100, (c) 0.5 to 10 parts by weight per 100 parts by weight of the total of the amounts of the components (a) and (b) of a linear olefinic polymer containing hydroxyl group which is liquid at room temperature, and (d) 0.5 to 15 parts by weight per 100 parts by weight of the total of the amounts of the components (a) and (b) of a linear olefinic polymer having a melting point of about 70° to about 90° C. and a number-average molecular weight of 1500 to 6000 and containing hydroxyl group or carbonyl group; and a protective strip for automobiles using the polypropylene resin composition are disclosed. Coating immediately after degreasing is made possible and excellent property for coating can be provided by using the polypropylene resin composition.

16 Claims, No Drawings

POLYPROPYLENE RESIN COMPOSITION AND A MOLDED ARTICLE THEREOF

BACKGROUND OF THE INVENTION

1. Field of the Invention

The present invention relates to a polypropylene resin composition and a molded article made of the polypropylene resin composition. More particularly, the present invention relates to a polypropylene resin composition having excellent coating property, peeling strength and elasticity and a protective strip for automobiles made of the polypropylene resin composition.

2. Description of the Related Arts

For automobile bumpers, compositions of polypropylene (PP) and ethylene-propylene rubber (EPR) have heretofore been used as materials. Polypropylene has extremely inferior coating property because it has no polar group in the molecule and chemically inert. For coating of a bumper made of such a composition, etching treatment with trichloroethane or the like is indispensable. This situation is not limited to coating of automobile bumpers. For coating of an article made of a polypropylenic composite material, it is the general practice that the article is processed with pretreatment of etching with trichloroethane to obtain practical coating strength (refer to Shosaku Yamamoto and Mikio Uchida, Jitsumu Hyomen Gijutsu, Vol. 31, Number 10, Page 440 (1984)).

However, trichloroethane causes environmental destruction, such as ozonosphere destruction, and thus a method using trichloroethane in coating must be avoided.

As materials to replace trichloroethane, surface active agents in the form of alkaline aqueous solutions can be mentioned. However, these surface active agents show low washing and dissolving ability when they are applied to PP and cannot be used for coating of an article made of a polypropylenic composite material, such as a bumper made of the composition described above.

On the other hand, methods of improving the property for coating by blending a polar substance with PP have been reported. As examples of such methods, a composition prepared by adding polyvinylphenol to a PP resin (Japanese Patent Application Laid-Open No. Heisei 3(1991)- 9941), and a composition prepared by adding a copolymer of ethylene and carboxylic acid compound to a PP resin (Japanese Patent Application Laid-Open No. Heisei 3(1991)- 278862) can be mentioned. However, these compositions do not always have sufficient adhesion of the coated layer when bumpers prepared by using these materials are coated after pretreatment of washing with a watery system.

Furthermore, polyvinyl chloride (PVC) has been frequently used as a material of molded parts of automobiles, such as protective strips, when a pretreatment with trichloroethane or the like is not applied. PVC occasionally generates toxic gas when it is burned. Therefore, application of PP particularly to protective strips for automobiles has been urgently desired.

SUMMARY OF THE INVENTION

The present inventors conducted extensive studies to develop a polypropylene resin composition by which the problems described above are solved and coating immediately after degreasing is made possible without pretreatment with a halogen-containing organic solvent, such as trichloroethane or the like.

As the result of the studies, it was discovered that a composition obtained by combined use of a specific olefinic polymer which is liquid at room temperature and a specific olefinic polymer which is solid at room temperature exhibits the excellent property for coating and that the aforedescribed object can be achieved by using this composition. The present invention was completed on the basis of this discovery.

Thus, the present invention provides a polypropylene resin composition comprising:

(a) 50 to 90% by weight of polypropylene, (b) 50 to 10% by weight of an ethylene-α-olefin copolymer elastomer having a Mooney viscosity (ML 1+4 (100° C.)) of 10 to 100 or a melt index (230° C., 2.16 kg) of 0.5 to 25 g/10 minutes, (c) 0.5 to 10 parts by weight per 100 parts by weight of the total of the components (a) and (b) of a linear olefinic polymer containing hydroxyl group which is liquid (viscosity, 5000 poise or less) at room temperature, and (d) 0.5 to 15 parts by weight per 100 parts by weight of the total of the components (a) and (b) of a linear olefinic polymer having a melting point of about 70° to about 90° C. and a number-average molecular weight of 1500 to 6000 and containing hydroxyl group or carbonyl group and a protective strip for automobiles using said composition.

Other and further objects, features and advantages of the invention will appear more fully from the following description.

DESCRIPTION OF PREFERRED EMBODIMENTS

As described above, the polypropylene resin composition of the present invention comprises the components (a) to (d).

PP of the component (a) of the present invention is not particularly limited. Preferable examples include isotactic propylene homopolymer having crystallinity, ethylene-propylene random copolymers having a small content of ethylene unit, propylene block copolymers composed of a homopolymer part consisting of propylene homopolymer and a copolymer part consisting of ethylene-propylene random copolymer having a relatively large content of ethylene unit, and crystalline propylene-ethylene-α-olefin copolymers having a structure which is obtained by additionally containing a copolymerized α-olefin unit, such as butene-1 unit, in the homopolymer part or the copolymer part of the propylene block copolymer described above. Melt index: MI (230° C., 2.16 kg Load) of PP is not particularly limited but preferably 0.5 to 100 g/10 minutes, and more preferably 1 to 50 g/10 minutes.

Content of the component (a) in the polypropylene resin composition is 50 to 90% by weight, preferably 60 to 80% by weight, based on the total of the amounts of the components (a) and (b). When the content is less than 50% by weight, physical properties of the obtained composition, such as stiffness, are inferior. When the content is more than 90% by weight, high coating adhesion cannot be obtained.

The ethylene-α-olefin copolymer elastomer of the component (b) is, for example, a copolymer of ethylene and an α-olefin, such as ethylene-propylene copolymer, ethylene-1-butene copolymer, or ethylene-1-hexene copolymer, or a copolymer of a non-conjugated diene and these monomers. The copolymer is an amorphous copolymer or a copolymer of low crystallinity having an initial modulus preferably of 400 kg/cm² or less, more preferably of 200 kg/cm² or less and particularly preferably of 100 kg/cm² or less. The initial modulus is measured according to Japanese Industrial Standard K-6301. Content of ethylene is preferably 40 to 80% by weight, and more preferably 50 to 75% by weight. Specific examples of the non-conjugated diene described above include dicyclopentadiene, 1,4-hexadiene, cyclooctadiene, dicyclooctadiene, methylenenorbornene, 5-ethylidene-2-norbornene, 5-vinyl-2-norbornene, 5-methylene-2-norbornene, 5-methyl-1,4-hexadiene, and 7-methyl-1,6-octadiene.

The ethylene-α-olefin copolymer elastomer has a Mooney viscosity ML 1+4 (100° C.) generally in the range of 10 to 100, preferably in the range of 15 to 50.

Specific examples of the ethylene-α-olefin copolymer elastomer include ethylene-propylene copolymer rubber (EPM), ethylene-1-butene copolymer rubber, ethyleneopropylene-1-butene copolymer rubber, ethylene-propylene-nonoconjugated diene copolymer rubber (EPDM), ethylene-1-butene-nonoconjugated diene copolymer rubber, and ethylene-propylene-1-butene-non-conjugated diene copolymer rubber.

Particularly preferable examples of the ethylene-α-olefin copolymer elastomer include ethylene-propylene copolymer rubber, ethylene-propylene-non-conjugated diene terpolymer rubber and ethylene-propylene-butene-1 copolymer rubber.

As the ethylene-propylene copolymer rubber, a copolymer containing 20 to 60% by weight of propylene and having Mooney viscosity ML 1+4 (100° C.) of 10 to 100, preferably 15 to 50, is preferable.

As the ethylene-propylene-non-conjugated diene copolymer rubber (EPDM), a copolymer having an iodine value of 20 or less is preferable. Copolymers in the ranges described above have the excellent property for coating, show excellent balance in physical properties and are advantageously used.

As the ethylene-propylene-butene-1 copolymer rubber, a copolymer containing propylene and butene-1 in an amount of 20 to 60% by weight of the total amount and having Melt Index: MI (230° C., 2.16 kg load) of 0.5 to 25 g/10 minutes, preferably i to 20 g/10 minutes, is preferable. The content of the components described above is obtained by a conventional method, such as the infrared spectrum analysis or the nuclear magnetic resonance method. It is preferred that the rubber is substantially amorphous. However, a rubber having some degree of crystallinity may be used as well. In this case, the crystallinity is preferably 5% or less, and more preferably 4% or less. The rubber is particularly effectively used when the crystallinity is 3% or less. The rubber is used in the form of pellets in many cases and may be used in the form of a crumb or a bale so long as the mixing operation is not adversely affected.

Content of the component (b) is 50 to 10% by weight, preferably 40 to 20% by weight, more preferably 35 to 20% by weight, based on the total of the amounts of the components (a) and (b). When the content is less than 10% by weight, the composition obtained is not provided with the sufficient property for coating. On the contrary, when the content is more than 50% by weight, physical properties, such as stiffness, are inferior.

The linear olefinic polymer containing hydroxyl group which is liquid (having a viscosity of 5000 poise or less) at room temperature of the component (c) is, for example, a polymer derived from 1,4-polybutadiene, 1,2-polybutadiene or polyisoprene. A liquid isoprenic polymer containing hydroxyl group or a hydrogenation product thereof is particularly preferable. The hydrogenation product of the liquid isoprenic polymer containing hydroxyl group can be obtained by hydrogenating the liquid isoprenic polymer containing hydroxyl group. As the liquid isoprenic polymer containing hydroxyl group, known materials can be utilized according to desire. It can also be easily prepared by a conventional method. For example, it can be obtained by radical polymerization of isoprene monomer using hydrogen peroxide, an azo compound containing hydroxyl group (such as 2,2'-azobis(2-methyl-N-(hydroxyethyl)-propionamide) or a peroxide containing hydroxyl group (such as cyclohexanone peroxide) as the initiator. Amount of the initiator used for the polymerization is not particularly limited but the suitable amount is generally 1.0 to 50 g when hydrogen peroxide is used and 5.0 to 100 g when 2,2'-azobis(2-methyl-N-(hydroxyethyl)-propionamide is used, each based on 100 g of the isoprene monomer. It is possible that the polymerization is conducted without a solvent. However, the polymerization is preferably conducted in a solvent because the reaction can be controlled more easily. Ethanol, isopropanol, n-butanol or the like, is generally used as the solvent. Suitable reaction temperature is 80° to 150° C. and suitable reaction time is 0.5 to 15 hours.

In another method of preparation of the liquid polyisoprenic polymer containing hydroxyl group, living polymer of isoprene is obtained by anionic polymerization of isoprene monomer using a catalyst, such as naphthalene dilithium, and a monoepoxy compound is brought to reaction with the living polymer to prepare the liquid polyisoprenic polymer containing hydroxyl group. It is possible that the polymerization is conducted without a solvent. However, the polymerization is preferably conducted in a solvent because the reaction can be controlled more easily. A saturated hydrocarbon, such as hexane or cyclohexane, is used as the solvent. Suitable reaction temperature is 50° to 100° C. and suitable reaction time is 1 to 10 hours. In the polymerization, another monomer in an amount of 50 mol % or less of the total amount may be added. Examples of the added monomer include addition polymerizable monomers having 2 to 22 carbon atoms, such as butene, pentene, styrerie, a-methylstyrene, acrylonitrile, acrylic acid, esters of acrylic acid, methacrylic acid, esters of methacrylic acid, vinyl chloride, vinyl acetate, and acrylamide, and diene monomers having 4 to 22 carbon atoms, such as butadiene, chloroprene, and 1,3-pentadiene, cyclopentadiene.

After finishing the polymerization reaction, the solvent is removed by distillation under a reduced pressure and a liquid isoprenic polymer containing hydroxyl group can be obtained.

Number-average molecular weight of the liquid isoprenic polymer containing hydroxyl group thus obtained is 500 to 6000, preferably 500 to 5000, more preferably 1000 to 5000, and most preferably 1000 to 3500. The polymer preferably has a structure in which the total of the contents of the cis-1,4 structure and the trans-1,4 structure is 70% by weight or more. The hydroxyl groups contained may be located either at the ends of the molecular chain or at the inner parts of the molecular chain. They are preferably located at the ends of the molecular chain. In the present invention, two or more kinds of the liquid isoprenic polymer containing hydroxyl group may be used in combination. Maleic anhydride or epoxy group may be added to the liquid isoprenic polymer containing hydroxyl group.

The hydrogenation product of the liquid isoprenic polymer containing hydroxyl group can be generally prepared by hydrogenating the liquid isoprenic polymer containing hydroxyl group described above by a conventional method using a homogeneous catalyst or a heterogeneous catalyst.

When a homogeneous catalyst is used, the hydrogenation reaction is conducted in a solvent of a saturated hydrocarbon, such as hexane or cyclohexane, generally at a reaction temperature of room temperature to 150° C. under a hydrogen pressure of atmospheric pressure to 50 kg/cm²G. As the homogeneous catalyst, a Ziegler catalyst, such as a combination of a transition metal halide with an alkyl compound of aluminum, an alkaline earth metal or an alkali metal, is preferably used in an amount of 0.01 to 0.1 mol % per one double bond in the polymer described above. The reaction is generally finished in 1 to 24 hours.

When a heterogeneous catalyst is used, the hydrogenation reaction is conducted in a solvent of a saturated hydrocarbon, such as hexane or cyclohexane, an aromatic hydrocarbon, such as benzene, toluene or xylene, an ether, such as diethyl ether, tetrahydrofuran or dioxane, an alcohol, such as ethanol or isopropanol, or a mixture thereof, generally at a reaction temperature of room temperature to 200° C. under a hydrogen pressure of atmospheric pressure to 100 kg/cm²G. As the heterogeneous catalyst, a catalyst, such as nickel, cobalt, palladium, platinum, rhodium or ruthenium, is used alone or in the form supported on a support, such as silica, diatomaceous earth, alumina or activated charcoal. Suitable amount of the catalyst is 0.05 to 10% by the weight of the polymer. The catalyst may be used singly or as a mixture of two or more kinds. The reaction is generally finished in 1 to 48 hours.

After finishing the reaction, the catalyst is removed by filtration and the solvent is removed by distillation under a reduced pressure to obtain a hydrogenation product of the liquid isoprenic polymer containing hydroxyl group.

Number-average molecular weight of the hydrogenation product of the liquid isoprenic polymer containing hydroxyl group is 500 to 6000, preferably 500 to 5000, more preferably 1000 to 5000, and most preferably 1000 to 3500. When the number-average molecular weight is smaller than 500, bleeding tends to occur in the composition and it becomes difficult to obtain a composition having the excellent property for coating. When the number-average molecular weight is larger than 6000, the effect of the polar group introduced into the composition is lost and the improvement in the property for coating of the composition is insufficient.

In the present invention, degree of hydrogenation of the hydrogenation product described above is kept at 80% or more, preferably 95% or more, for enhancing weatherability of the composition. When the degree of the hydrogenation is less than 80%, weatherability of the composition obtained is inferior.

The hydrogenation product obtained above may be used singly or as a mixture of two or more kinds.

In the present invention, average number of hydroxyl group per one molecule of the hydrogenation product is adjusted to 1.5 to 3 to obtain a composition having the excellent property for coating. When the average number of hydroxyl group is less than 1.5, the effect of the polar group introduced to the composition is insufficient or lost and sufficient improvement effect of the property for coating is not obtained. When the average number of hydroxyl group is more than 3, the polar nature of the composition is excessively enhanced to cause decrease in compatibility of the hydrogenation product with the polypropylene resin.

Amount of the component (c) described above is 0.5 to 10 parts by weight, preferably 0.7 to 10 parts by weight, more preferaly 1 to 10 parts by weight, most preferably 0.7 to 5 parts by weight, per 100 parts by weight of the total of the amounts of the components (a) and (b). When the amount is less than 0.5 parts by weight, the composition obtained is not provided with the sufficient property for coating. When the amount is more than 10 parts by weight, bleeding to the surface is increased or physical properties, such as stiffness, are inferior.

The linear olefinic polymer of the component (d) has a melting point (softening point) of about 70° to about 90° C. and a number-average molecular weight of 1500 to 6000, preferably 1500 to 5000, and contains hydroxyl group or carbonyl group. It is, for example, a hydrogenation product of 1,4-polybutadiene containing hydroxyl group, or ethylene-butene-1 copolymer containing hydroxyl group.

As the linear olefinic polymer, 1,4-polybutadiene containing 1.5 to 3 hydroxyl groups per one molecule and having a structure in which 80 % or more of the unsaturated bonds in the molecular chain are hydrogenated is preferably used.

Method of preparation of the hydrogenation product of 1,4-polybutadiene containing hydroxyl group is the same as that of the component (c) described above. It is particularly preferable that content of the 1,4-structure is adjusted to 90 to 70%. When the content of the 1,4structure is larger than 90%, melting point becomes higher than about 90° C. When it is smaller than 70%, melting point becomes lower than about 70° C. The property for coating may be deteriorated in either case.

Degree of hydrogenation should be 80% or more, and preferably 95 % or more. When the degree of hydrogenation is low, weatherability of the composition is decreased and melting point of the composition becomes about 70° C. or lower, to deteriorate the property for coating. Content of the component (d) described above is 0.5 to 15 parts by weight, preferably 0.7 to 10 parts by weight, based on 100 parts by weight of the total of the amounts of the components (a) and (b). When the content is less than 0.5 parts by weight, the composition obtained is not provided with the sufficient coating property. When the content is more than 15 parts by weight, physical properties are deteriorated. Thus, an amount out of the specified range is not preferable.

The polypropylene resin composition of the present invention comprises the components (a) to (d) as the essential components thereof. Other additives, such as heat stabilizer, weathering stabilizer, antistatic agent, lubricant, slipping agent, nucleation agent, flame retardant, pigment, dyestuff, glass fiber, talc, calcium carbonate, and carbon fiber, may be added in suitable amounts. Particularly, talc is preferably used for the purpose of increasing stiffness and dimensional stability of molded products. It is also possible that a material for improving impact strength, such as ethylene-α-olefin copolymer elastomer, is added.

The polypropylene resin composition of the present invention may include all the combinations of the various compounds included in each of the components (a) to (d) according to desire. It may also include any combinations containing the other additives described above according to necessity. Furthermore, a compound represented by one of the following general formulae:

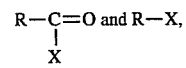

wherein R is a linear alkyl group having 10 to 22 carbon atoms and X is a group selected from the following groups:

-continued

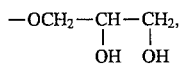

may be added. Preferable examples of the compounds shown above include stearic acid monoglyceride, stearyl diethanolamine, N-diethanolstearic acid amide, and N-diethanoldodecanamide. Amount of the above compounds added to the composition is generally 0.1 to 10 parts by weight based on 100 parts by weight of the total of the amounts of the components (a) and (b).

The polypropylene resin composition of the present invention can be prepared by the same method as that of preparation of conventional polypropylene resin compositions. Order of mixing of the components (a) to (d) and various kinds of additive may be suitably selected according to desire. For mixing the components described above, a conventional mixer, such as a kneader, rolls or a Banbury mixer, a single screw extruder or a twin screw extruder can be used.

All the polypropylene resin compositions of the present invention described above can be used for desired molded articles without particular restriction. However, when protective strips for automobiles which are heretofore made of PVC is prepared by using the polypropylene resin composition of the present invention, not only the excellent property for coating is achieved but also environmental problems, such as problems on recycling, and generation of toxic gas, can be effectively avoided.

The protective strip for automobiles is a part of an automobile attached to the side part of the automobile to prevent damage to the body. Shape of the strip is not particularly limited but preferably a molded article of a belt shape having a width of 100 mm or less and a length of about 1000 mm. It is attached to doors on the sides of an automobile at a position extending from the front part to the rear part of the body. For attaching to the body, the protective strip desirably has such a molded structure that it is attached to the body with an adhesive or with clips mechanically.

Injection molding or blow molding is generally used as the method of production of a protective strip for automobiles. To produce a protective strip for automobiles from the polypropylene resin composition of the present invention, of course, the injection molding or the blow molding may be used. However, the method of gas injection molding (GIM) is particularly preferably used for the production because of good appearance of surface, dimensional stability and light weight.

In the GIM method, cavity in a mold is filled with a melt resin and then a cavity is formed at the inner part of the melt resin filling the mold cavity by injection of a gas of high pressure. The GIM method is not particularly limited so long as it is performed in this manner.

As a preferable method of molding, it is desirable that a gas channel guide of a larger thickness is placed in the mold, extending continuously from the inlet of gas to the end of the mold. In this method, location of the cavity formed at the inner part of the melt resin by the injection of gas is limited to the part along this gas channel, When the continuous part of a larger thickness is not present extending continuously from the inlet of gas to the end of the mold, fluidization of the resin by the pressurized gas is insufficient and stiffness of the molded product is decreased. When the pressurized gas enters into a part other than the part along the continuous part of a larger thickness, strength of the other part of the molded product is decreased.

To summarize the advantages obtained by the invention, by using the polypropylene resin composition of the present invention, coating immediately after degreasing is made possible without pretreatment with an organic solvent containing halogen, such as trichloroethane, and a coating layer of excellent elasticity and peeling strength is provided.

Therefore, the polypropylene resin composition of the present invention can be advantageously utilized for polypropylene molded articles with coating, such as a polypropylene bumper with coating, and a protective strip for automobiles.

The invention will be understood more readily with reference to the following examples; however, these examples are intended to illustrate the invention and are not to be construed to limit the scope of the invention.

EXAMPLES 1 TO 4 AND COMPARATIVE EXAMPLES 1 TO 5

Into a mixing extruder (NVC-50ϕ, a product of Nakatani Koki Co., Ltd.), specified amounts of the components shown in Table 1 were charged simultaneously and mixed to prepare a resin composition.

For coating, an injection molded product of the resin composition thus obtained (420 mm×100 mm×4 mm) was washed with a neutral detergent, washed with an ion exchanged water thoroughly, dried at 80° C. for 30 minutes, coated with a primer (RB 150, a product of Nippon Bee Chemical Co., Ltd.), then spray coated with a urethane coating material and baked at 80° C. for 30 minutes.

Adhesion of the urethane coating layer in the coated molded article was evaluated by the inclined grid test and by the gasohole property. In the inclined grid test, eleven cut lines each in the two rectangular directions were formed on the coating layer by a cutter blade inclined with about 45° angle to form 100 sections. Peeling test was conducted with a cellophane tape (Japanese Industrial Standard Z-1522). Adhesion was evaluated by the peeled area according to the following criterion:

◯: no peeling

◯~Δ: peeling of about 5%

Δ: peeing of about 20% x: peeling of about 50%

The gasohol property was evaluated by dipping a sample in a mixed solution of gasoline/ethanol=90/10 at 20° C. and measuring the time to peeling. It is generally required that no change is observed for 30 minutes or more.

Bending modulus of a molded article was measured according to Japanese Industrial Standard K-6301.

Results obtained are shown in Table 2.

TABLE 1

| | \multicolumn{5}{c}{resin composition} |
|---|---|---|---|---|---|
| | component (a) (g) | component (b) (g) | component (c) (g) | component (d) (g) | additive (g) |
| | | | (Part 1) | | |
| Example 1 | PP*1 62 | EPR-1*2 30 | HIP-1*4 1 | HBD-1*7 1 | talc*10 6 |
| Example 2 | PP*1 65 | EPR-2*3 20 | HIP-2*5 2 | HBD-2*8 7 | talc*10 6 |
| Example 3 | PP*1 63 | EPR-2*3 30 | HIP-2*5 1 | HBD-2*8 4 | talc*10 6 |
| Example 4 | PP*1 65 | EPR-1*2 35 | HIP-3*6 1 | HBD-1*7 1 | talc*10 6 |
| | | | (Part 2) | | |
| Comparative Example 1 | PP*1 64 | EPR-1*2 30 | | EAA*9 6 | talc*10 6 |
| Comparative Example 2 | PP*1 71 | EPR-1*2 20 | HIP-1*4 3 | | talc*10 6 |
| Comparative Example 3 | PP*1 44 | EPR-1*2 50 | HIP-2*5 1 | HBD-1*7 2 | talc*10 6 |
| Comparative Example 4 | PP*1 84 | EPR-1*2 5 | HIP-3*6 5 | EAA*9 8 | talc*10 6 |
| Comparative Example 5 | PP*1 74 | EPR-2*3 20 | HIP-1*4 0.05 | HBD-2*8 0.2 | talc*10 6 |

*[1] Ethylene-propylene block copolymer (J-950H; a product of Idemitsu Petrochemical Co., Ltd.; MI = 20 g/10 minutes (230° C.); ethylene content, 6.3% by weight)
*[2] Ethylene-propylene rubber (EP02P; a product of Japan Synthetic Rubber Co., Ltd.; ML 1 + 4 (100° C.) = 24; ethylene content, 74% by weight)
*[3] Ethylene-propylene rubber (EP921; a product of Japan Synthetic Rubber Co., Ltd.; ML 1 + 4 (100° C.) = 27; ethylene content, 50% by weight)
*[4] A hydrogenation product of liquid isoprenic polymer containing hydroxyl group (number-average molecular weight = 2410; viscosity, 800 poise; average number of hydroxyl group per one molecule = 2.27; degree of hydrogenation = 96.4%)
*[5] A hydrogenation product of liquid isoprenic polymer containing hydroxyl group (number-average molecular weight = 1410; average number of hydroxyl group per one molecule = 2.23; degree of hydrogenation = 97.8%)

*[6] A hydrogenation product of liquid isoprenic polymer containing hydroxyl group (number-average molecular weight = 4900; average number of hydroxyl group per one molecule = 1.80; degree of hydrogenation = 99.0%)

*[7] A hydrogenation product of liquid 1,4-polybutadiene containing hydroxyl group (number-average molecular weight = 3000; melting point, about 75° C.; average number of hydroxyl group per one molecule = 1.96; content of 1,4-structure = 80% degree of hydrogenation = 95%)
*[8] A hydrogenation product of liquid 1,4-polybutadiene containing hydroxyl group (number-average molecular weight = 1500; melting point, about 75° C.; average number of hydroxyl group per one molecule = 1.96; content of 1,4-structure = 80% degree of hydrogenation = 96%)
*[9] Ethylene-acrylic acid copolymer (AC5120; a product of Allied-Signal Company; number-average molecular weight = 3000; melting point, about 89° C.)
*[10] talc (Asada talc CT76; a product of Asada Seifun Co., Ltd.)

TABLE 2

| | evaluation of physical properties | | |
|---|---|---|---|
| | bending modulus (kg/cm$^2$) | inclined grid test | gasohol property (minute) |
| Example 1 | 9000 | ○ | 40 |
| Example 2 | 9000 | ○ | >120 |
| Example 3 | 8000 | ○ | >120 |
| Example 4 | 8000 | ○ | >120 |
| Comparative Example 1 | 9000 | ○ | 5 |
| Comparative Example 2 | 10000 | ○~Δ | 5 |
| Comparative Example 3 | 4000 | ○ | >120 |
| Comparative Example 4 | 11000 | x | 5 |
| Comparative Example 5 | 11000 | x | 5 |

What is claimed is:

1. A polypropylene resin composition comprising:
   (a) 50 to 90% by weight of polypropylene,
   (b) 50 to 10% by weight of an ethylene-α-olefin copolymer elastomer having a Moony viscosity (ML 1+4(100° C.)) of 10 to 100 or a melt index (230° C.,2.16 kg) of 0.5 to 25 g/10 minutes,
   (c) 0.5 to 10 parts by weight per 100 parts by weight of the total of the amounts of the components (a) and (b) of hydrogenated hydroxyl containing isoprene polymer which is liquid at room temperature, and
   (d) 0.5 to 15 parts by weight per 100 parts by weight of the total of the amounts of the components (a) and (b) of hydrogenated hydroxyl containing butadiene polymer having a melting point of about 70° to about 90° C. and a number-average molecular weight of 1500 to 6000.

2. A polypropylene resin composition as claimed in claim 1, wherein the polypropylene of the component (a) is a propylene block copolymer composed of a homopolymer part consisting of propylene homopolymer and a copolymer part consisting of ethylene-propylene random copolymer.

3. A polypropylene resin composition as claimed in claim 1, wherein the ethylene-α-olefin copolymer elastomer of the component (b) has a Mooney viscosity (ML 1+4 (100° C.)) of 15 to 50.

4. A polypropylene resin composition as claimed in claim 1, wherein the ethylene-α-olefin copolymer elastomer of the component (b) is selected from the group consisting of ethylene-propylene copolymer rubber, ethylene-propylene-non-conjugated diene terpolymer rubber and ethylene-propylene-butene-1 copolymer rubber.

5. A polypropylene resin composition as claimed in claim 1, wherein the hydrogenated hydroxyl containing isoprene polymer is a hydrogenated liquid isoprenic polymer containing hydroxyl group having a structure in which 80% or more of the unsaturated bonds in the molecular chain are hydrogenated.

6. A polypropylene resin composition as claimed in claim 5, wherein the hydrogenated liquid isoprenic polymer contains 1.5 to 3 hydroxyl groups per one molecule.

7. A polypropylene resin composition as claimed in claim 5, wherein the hydrogenated liquid isoprenic polymer has a structure in which 95% or more of the unsaturated bonds in the molecular chain are hydrogenated.

8. A polypropylene resin composition as claimed in claim 5, wherein the hydrogenated liquid isoprenic polymer has a number-average molecular weight of 500 to 6000.

9. A polypropylene resin composition as claimed in claim 1, wherein the hydrogenated hydroxyl containing butadiene polymer of the component (d) contains 1.5 to 3 hydroxyl groups per one molecule and has a structure in which 80% or more of the unsaturated bonds in the molecular chain are hydrogenated.

10. A polypropylene resin composition as claimed in claim 9, wherein component (d) is 1,4-polybutadiene containing hydroxyl group.

11. A polypropylene resin composition as claimed in claim 1, wherein the composition comprises talc additionally.

12. A protective strip for automobiles prepared by gas injection molding of the polypropylene resin composition described in claim 1.

13. A protective strip for automobiles prepared by gas injection molding of the polypropylene resin composition described in claim 5.

14. A protective strip for automobiles prepared by gas injection molding of the polypropylene resin composition described in claim 6.

15. A protective strip for automobiles prepared by gas injection molding of the polypropylene resin composition described in claim 9.

16. A protective strip for automobiles prepared by gas injection molding of the polypropylene resin composition described in claim 10.

* * * * *